June 20, 1939. E. N. MECK Re. 21,123

METHOD OF TAPING AND BINDING SHOES

Original Filed March 2, 1932

Inventor:
Edgar Nevin Meck.
By Paul Carpenter
Atty

Reissued June 20, 1939 Re. 21,123

UNITED STATES PATENT OFFICE 21,123

METHOD OF TAPING AND BINDING SHOES

Edgar Nevin Meck, Portsmouth, Ohio, assignor, by mesne assignments, to Minnesota Mining & Manufacturing Company, St. Paul, Minn., a corporation of Delaware Original No. 1,909,206, dated May 16, 1933, Serial No. 596,319, March 2, 1932. Application for reissue May 14, 1935, Serial No. 21,484

5 Claims. (Cl. 154—42)

Figure 1:
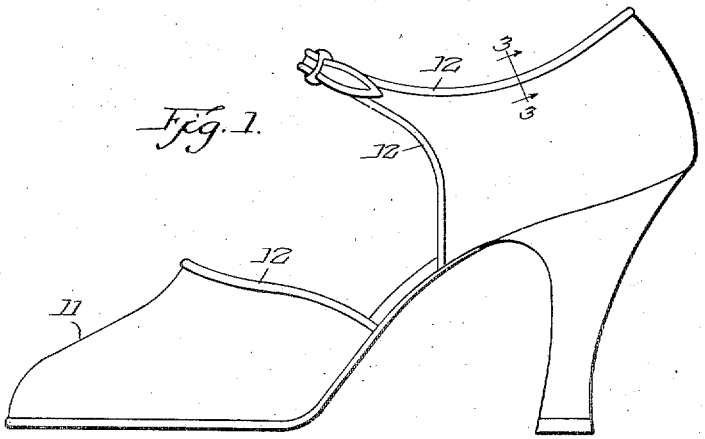

My invention relates to the securing of taping and binding to the upper margins of shoes and is also applicable to bags, purses, gloves, etc.

It is customary to strengthen or reinforce the upper margins of shoe uppers, vamps or quarters by a tape laid on the inside of these parts, close to the upper edge, which tape in the methods heretofore used was caused to adhere to the shoe by some adhesive material coated on the side of the tape which comes in contact with the shoe. This tape is usually applied to the shoe under more or less pressure, either by hand or by some form of tape laying machine which often results in faulty laying of the tape and that the tape is only laid relatively in its proper position and that the adhesive used is often faulty and does not hold the tape in the desired position, whereby when the binding is attached to the shoe upper and is drawn over the upper margin it presents an irregular edge detracting from the graceful lines intended for the shoe.

My invention overcomes the defects of the old method and improves the laying of the tape which is done simultaneously with the securing of the binding to the outer edge of the shoe upper. This binding comprises a ribbon, usually silk or cotton grosgrain, but which may be of any other material, which after being stitched to the outer margin of the shoe simultaneously with the stitching of the tape on the inner margin of the shoe in one operation, is then drawn over the margin of the shoe for forming the effect of a cord along the exposed edges of the shoe upper which is commonly termed French cord binding or imitation binding.

The object of my invention is to provide a method for simultaneously securing the binding material and the tape to the respective sides, adjacent to the upper margin of a shoe upper. A further object is to provide the exposed face of the tape, which is toward the inside of the shoe with an adhesive for securing the binding thereto after the binding has been drawn over the upper margin of the shoe upper. A further object is to coat both sides of the tape with an adhesive prior to the combined stitching of the binding and tape to the shoe upper.

Further objects of my invention are to provide a sheeted material coated on both sides with an adhesive; to provide a means for adhesively joining two layers of sheeted material comprising an adhesive carrier of sheeted material coated on both sides with an adhesive; to provide a sheeted material coated on both sides with an adhesive serving as a vehicle to facilitate the introduction of adhesive between a binding material and a material to be bound whereby said binding material and said material to be bound will be retained in predetermined relation to each other; to provide a sheeted material coated on both sides with an adhesive serving as a vehicle to facilitate the introduction of adhesive between a binding material and a material to be bound whereby said binding material and said material to be bound will be retained in predetermined relation to each other, said sheeted material acting as a reinforcing element for said material to be bound; to provide a reinforcing tape for a shoe upper, or the like, coated on both sides with an adhesive; to provide a method for adhesively securing together two thicknesses of sheeted material by a sheeted material previously coated on both sides with an adhesive; to provide a method for adhesively securing together and reinforcing two thicknesses of sheeted material by a sheeted reinforcing material previously coated on both sides with an adhesive; to provide a French binding for a shoe upper or the like characterized by an adhesive vehicle coated on both sides with an adhesive and inserted between the binding and the upper; to provide a reinforced French binding for a shoe upper or the like characterized by the use of a reinforcing tape coated on both sides with an adhesive for retaining the binding in a predetermined relation to the upper.

Figure 2:
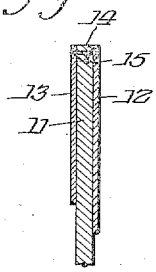
Figure 3:
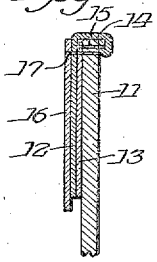
Figure 4:
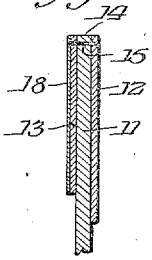
Figure 5:
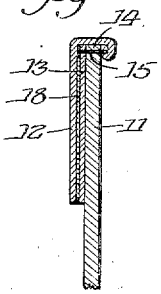
Figure 6:
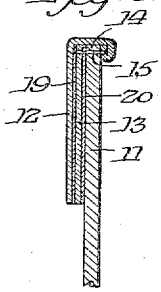

The invention will be further readily understood from the following description and claims and from the drawing, in which latter:

Fig. 1 is a side view of a shoe,

Fig. 2 is an enlarged detailed section showing the binding and the tape secured to the shoe upper, Fig. 3 is an enlarged cross-section taken in the plane of the line 3—3 of Fig. 1 showing the binding about the upper margin of the shoe and the lining secured to the shoe, Fig. 4 is an enlarged detailed section similar to Fig. 2 showing the tape provided with an adhesive coating on its exposed face, Fig. 5 is a further enlarged detailed section of the same showing the binding secured to the tape by means of the adhesive, and;

Fig. 6 is a similar view showing the tape coated with an adhesive on both sides.

I have exemplified my invention in connection with a shoe 11. My invention consists of the method of applying the binding 12 which is usually termed French cord binding, imitation French cord binding or imitation binding, which are well known terms used in the shoe trade. In carrying out my method, a usual sewing machine, which is commonly known as a Post type, although any suitable type may be used, wherein the tape 13 and the binding 12 may be simultaneously fed on opposite sides of the shoe 11, either adjacent to or spaced the desired distance from the edge 14 of the shoe, that it is desired to bind, by means of stitching the tape and binding while they are fed through the machine, such stitching being indicated at 15. The tape 13, is a reinforcing and strengthening band for the upper margin of the shoe, but I do not wish to limit myself to the ordinary tape, as it may be any suitable material that will aid in reinforcing the margin of the shoe. The binding 12 is drawn over the upper edge 14 of the shoe and is suitably secured to the tape by an adhesive, being later stitched to the shoe when affixing the lining 16 by means of stitches 17.

In Figs. 4 and 5, I have shown a modification of my method wherein the tape 13 is provided with a coating of adhesive 18, whereby the binding 12 can be secured to the tape by means of applying pressure after the binding has been drawn over the upper edge of the shoe.

In Fig. 6 a further modification is shown wherein the tape 13 is coated with an adhesive on both sides thereof as indicated at 19 and 20, whereby the binding will be secured to the tape and the tape to the shoe by means of applying pressure.

In the old method the reinforcing tape was cemented to the inner face of the shoe, which cementing often caused the tape or shoe to draw out of shape causing an irregular or more or less rough edge along the exposed margin of the shoe. The stitching of the binding to the shoe was a separate operation and when drawn over the upper margin, which was often rough, caused the upper margin with the binding thereabout to present an irregular edge to that part of the shoe which spoiled the general appearance of the shoe. With my method of simultaneously stitching the binding and tape in one operation to the shoe with both the tape and the binding being fed along the margin of the shoe by means of suitable guides on the sewing machine or otherwise, the tape and binding are stitched in the desired position with reference to the margin of the part being stitched, presenting a smooth regular edge to the shoe.

Reference has been made to taping and binding the margins of shoe uppers, but these are not the only parts that are bound and taped. Straps and any free edges are specifically included or any part of a shoe to which binding usually is or may be applied.

It is obvious that my method may be applied to various other articles, such as bags, purses, gloves, etc., wherein it is desired to bind the edges of such parts as would ordinarily be rough without binding thereabout.

Having thus described my invention and illustrated its use, what I claim as new and desire to secure by Letters Patent, is—

1. The method of applying binding to an article consisting of simultaneously stitching tape and binding on opposite sides adjacent to the edge being bound, providing said tape with an adhesive on both its faces, folding said binding over said edge and tape and securing said binding and tape to said article by pressure.

2. The method of applying binding to an article consisting of simultaneously stitching tape and binding on opposite sides adjacent to the edge being bound, providing said tape with an adhesive on both its faces, prior to stitching, folding said binding over said edge and tape and securing said binding and tape to said article by pressure.

3. The method of simultaneously applying a binding to an article and incorporating a reinforcing element with said binding and said article which comprises applying an adhesive to both faces of said reinforcing element, assembling said binding, article and reinforcing element with said element between said article and said binding and causing said article and said binding to adhere to the opposite faces of said element.

4. The method of binding a piece of work which comprises simultaneously attaching a reinforcing tape having adhesive coatings on both surfaces to one side of the work by one of said adhesive coatings, and a binding strip to the opposite side of the work, with the edges of said tape and strip flush with the edge of the work, and subsequently folding the body of said strip over the secured edge thereof, the edge of the work and said edge of the tape, and causing said strip to come into contact with and be retained by the other of said adhesive coatings on said reinforcing tape.

5. A method of binding the edge of sheet material, comprising the following steps: laying tape, adhesively coated on both sides, along one marginal face of the sheet material, lapping a binding strip, secured along its edge adjacent to the edge of the sheet material, over and around the edge of the sheet material and against the outer adhesive face of the tape.

EDGAR NEVIN MECK.